United States Patent [19]

Gutsfeld

[11] 4,104,536
[45] Aug. 1, 1978

[54] STREAM -OR RIVER-POWERED TURBINE

[76] Inventor: Anton Franz Gutsfeld, 13 London St. N., Hamilton, Ontario, Canada, L8H 4B2

[21] Appl. No.: 680,684

[22] Filed: Apr. 27, 1976

[51] Int. Cl.² .............................................. F03B 13/00
[52] U.S. Cl. ...................................... 290/54; 416/119
[58] Field of Search ...................... 290/42, 53; 60/495, 60/507; 416/111, 119

[56] References Cited

U.S. PATENT DOCUMENTS

| | | | |
|---|---|---|---|
| 646,712 | 4/1900 | Symons | 416/119 |
| 932,628 | 8/1909 | Meyer | 410/176 |
| 1,669,055 | 5/1928 | Hogg | 290/54 |
| 1,780,589 | 11/1930 | Fachnie | 416/85 |
| 2,097,286 | 10/1937 | McGee | 290/54 |
| 2,730,631 | 1/1956 | Dandini | 290/1 R |
| 3,993,913 | 11/1976 | Dickman | 290/53 |

*Primary Examiner*—Robert K. Schaefer
*Assistant Examiner*—John W. Redman
*Attorney, Agent, or Firm*—Sommer & Sommer

[57] ABSTRACT

A stream -or river-powered turbine consists of an elongated cylinder with radially-extending vanes, each vane having at its root a plurality of axially-spaced flap valves opening and closing corresponding openings therein. These valves open automatically as the vanes enter the tail wave to relieve the reverse pressure thereon, close while in the main stream to render the vanes fully effective, and open automatically as the vanes leave the stream to prevent the formation of vacuums on their trailing sides. The generator, which may be electric or hydraulic or pneumatic is mounted inside the cylinder and is driven as the result of relative rotation between an axial stationary torque tube and the cylinder via an oil lubricated chain that also serves to supply oil to other parts of the mechanism.

4 Claims, 4 Drawing Figures

STREAM -OR RIVER-POWERED TURBINE

FIELD OF THE INVENTION

This invention is concerned with improvements in or relating to stream-or river-powered turbines for the extraction of energy from such sources of moving water.

REVIEW OF THE PRIOR ART

Many attempts have been made in the past to extract energy from sources of moving water, such as streams or rivers, by anchoring a turbine or water wheel in the moving water to be rotated thereby. Such arrangements have the advantages that they do not require large expensive land-based installations, that they can be moved readily from place to place as required, and that the can be removed to shore for storage and service purposes. With the recent substantial increases in the costs of fossil fuel energy, sources such as streams and rivers become economically attractive provided suitable small efficient plants are available.

DEFINITION OF THE INVENTION

It is an object of the present invention to provide a new stream-or river-powered turbine.

It is a more specific object to provide a stream-or river-powered turbine having a new vane structure providing for particularly efficient operation.

It is another specific object of the invention to provide a new form of chain drive construction for use between relatively rotating parts.

In accordance with the present invention there is provided a new stream or river-powered turbine comprising:
  an elongated cylindrical body;
  a plurality of radial circumferentially-spaced vanes extending from the cylindrical outer surface of the body;
  each vane having therein a plurality of axially spaced openings; and
  a valve member for each opening adapted to open the opening upon encountering a tail wave, to close the opening while the vane is in the stream or river, and to open the opening as the vane rises from the stream or river.

Preferably, the said valves are flap valves pivoted to the respective vane on the trailing side thereof and urged in the closing direction by their own weight.

The said valves may be disposed immediately adjacent the roots of the respective vanes, and the said flap valves may be larger than their respective openings and close the openings by abutting against the surrounding portion of the vane.

The means for restraining the turbine in the stream or river may comprise a stationary torque member passing axially through the turbine body, and around which the turbine body is rotatably mounted, and preferably the torque member includes a hollow tube and means for feeding power from the turbine interior pass through the tube to the turbine exterior.

Also in accordance with the invention there is provided a drive between two relatively rotating parts, one of which is a cylindrical body and the other of which is a drive sprocket, the said drive comprising an endless chain member fastened to the interior cylindrical surface of the cylindrical body, and means enclosing the chain member except for the portion thereof engaged by the drive sprocket.

DESCRIPTION OF THE DRAWINGS

Generators which are particular preferred embodiments of the invention will now be described, by way of example, with reference to the accompanying diagrammatic drawings wherein.

DESCRIPTION OF THE PREFERRED EMBODIMENTS

Figure 1:
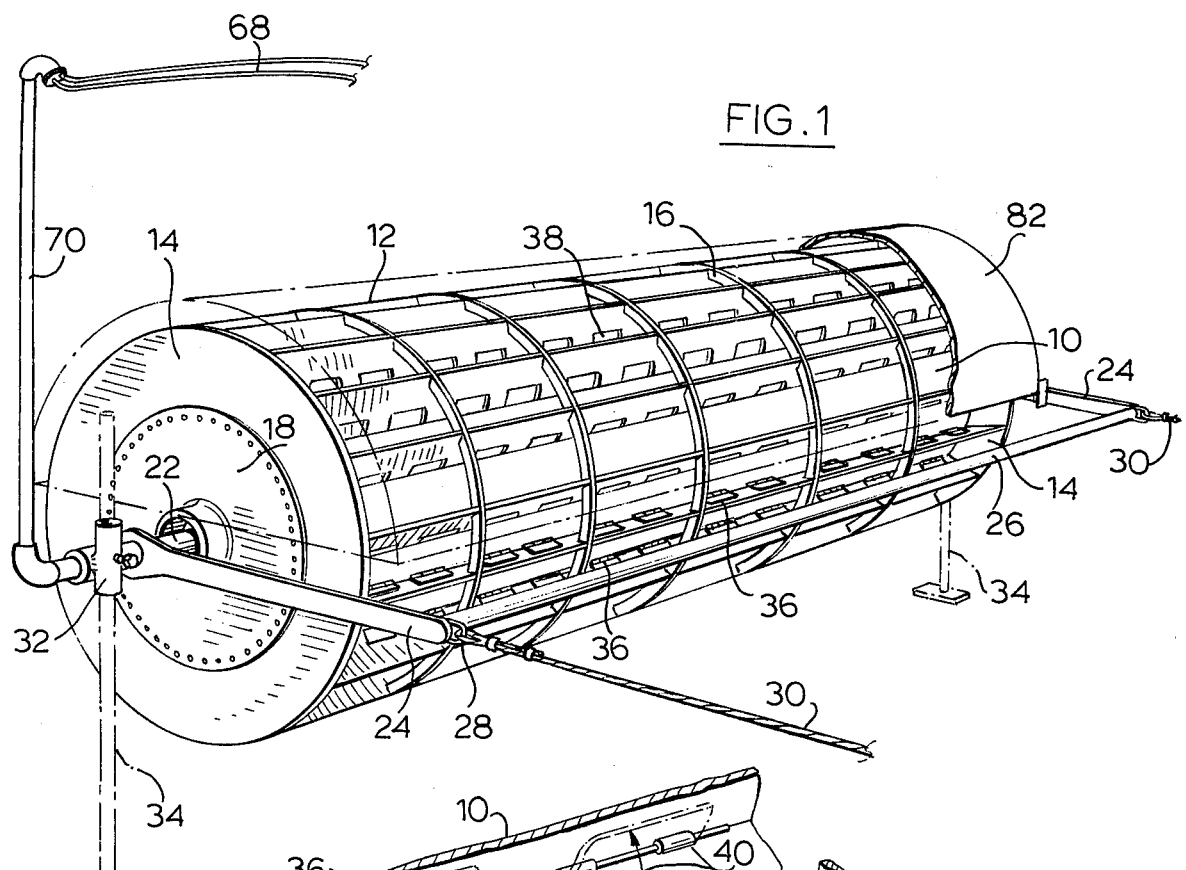
FIG. 1 is a perspective view of a generator disposed for use with a water flow passing from right to left as seen in the Figure.

The embodiments illustrated all are shown as operative with a water flow from right to left as seen in the drawings. The turbine consists of an elongated cylinder 10 disposed with its longitudinal axis horizontal, provided with a plurality of equally circumferentially-spaced radially-extending vanes 12 secured at their ends to circular end plates 14 and provided along their lengths with a plurality of equally-spaced reinforcing rings 16. Each end plate 14 is provided with a respective removable circular inspection plate 18 having a central axial collar 20 through which passes a hollow torsion tube 22. The tube has at each end an arm 24, the two arms being connected together by a cross-bar 26, the junctions of the arms and the cross bar having links 28 by which anchoring cables 30 are fastened thereto. Sleeves 32 are fastened at the ends of the bar and receive vertical safety struts 34 which serve to prevent the turbine from dropping to the bed of the stream or river in which it is operative. The openings through the collars 20 provide for a generous flow of cooling air through the turbine which may, if necessary, be supplemented by fan blades rotatable with the cylinder.

Figure 2:
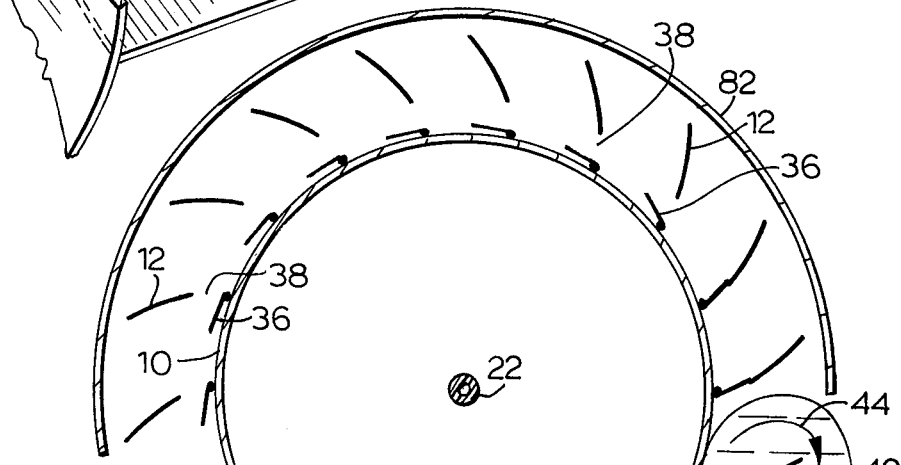
FIG. 2 is a view of a part of the generator of FIG. 1 to show a detail of its structure.
Figure 3:
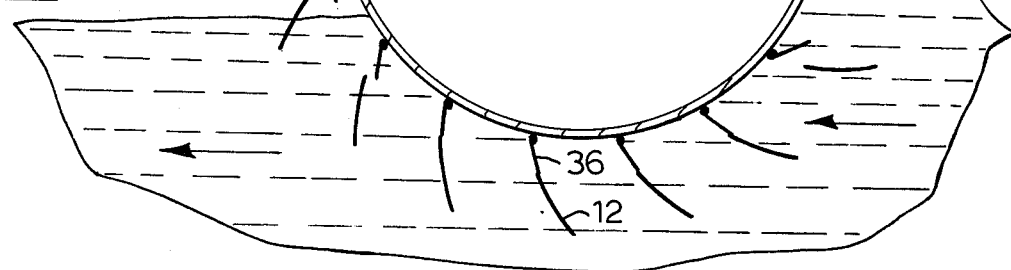
FIG. 3 is a plane cross-section on the line 3—3 of FIG. 4 to show the mode of operation of the generator vane valves.

Each vane 12 is concave on its trailing face and is provided close to its root with a plurality of equally-axially spaced flap valves 36, each of which is pivotally mounted on the concave side of the vane and is movable to close and open a corresponding opening 38 at the root, as indicated by the arrow 40 in FIG. 2.

As the turbine rotates in the stream, a tail wave 42 is created at the upstream side, having a circulation current indicated by the arrow 44. The vanes must pass through this adverse tail wave current before they can come under the positive influence of the stream, reducing the turbine efficiency. Again, as the vanes rise out of the stream a vacuum is created on the trailing side tending to lift the water with the vanes and also reducing the overall efficiency. The valves on the upstream side of the turbine close under their own weight, but immediately they encounter the tail wave 42 they automatically bounce open under its action to permit the vanes to pass more easily therethrough.

Once the vanes have become fully immersed in the main part of the stream, the flowing water on their trailing faces automatically closes the valves against the openings 38, so that the vanes are fully effective during this operative part of their path of movement. As the vanes rise out of the water on the downstream side of the turbine the valves are relieved of the water pressure, and subsequently the vacuum formed at the trailing side of the vanes ensures that they open quickly and automatically to relieve that vacuum. The turbine is therefore able to operate with maximum available efficiency.

Figure 4:
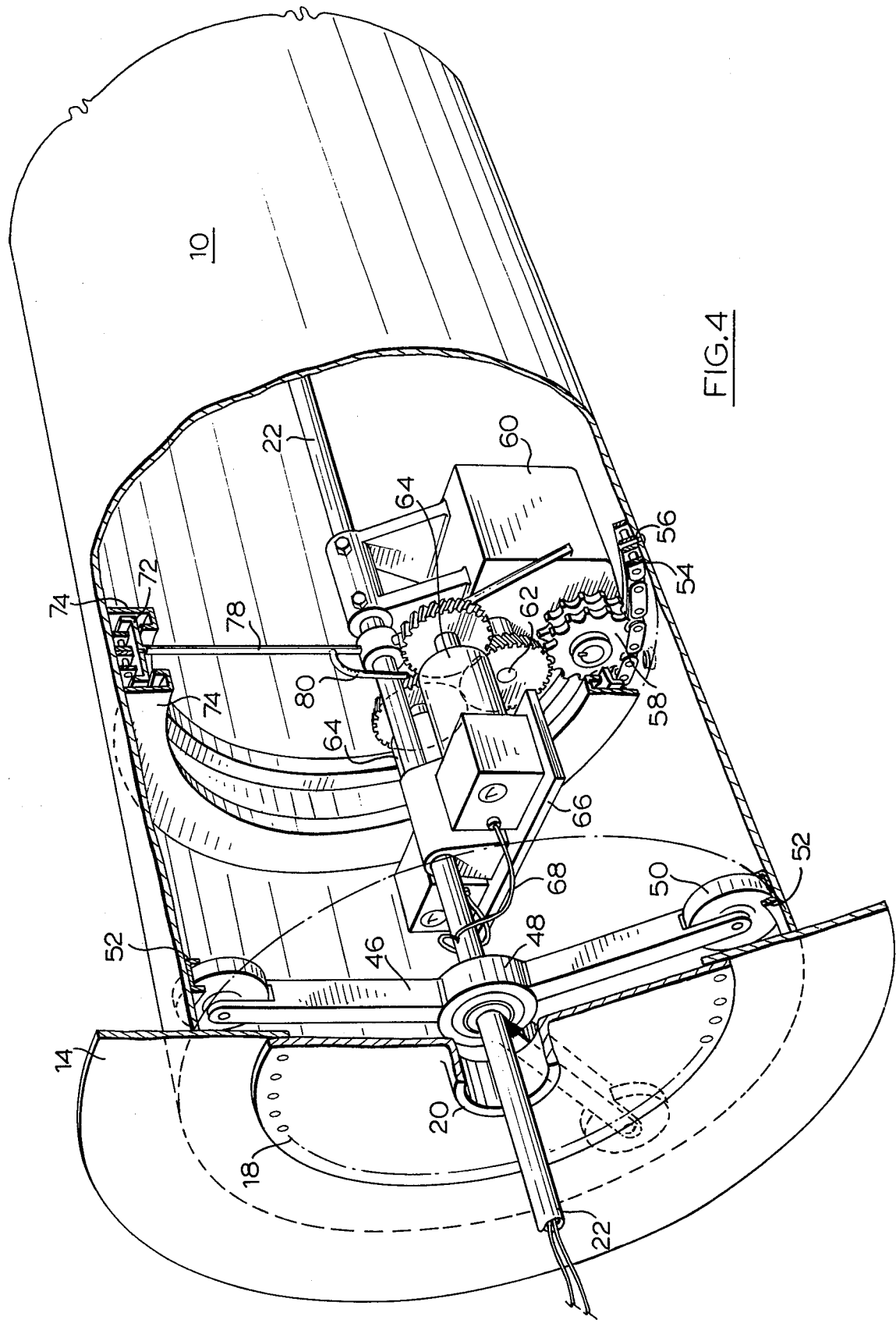
FIG. 4 is a perspective view with the generator vanes omitted and part of the exterior casing broken away to show the interior arrangement.

Referring now especially to FIG. 4 the cylinder 10 is mounted for rotation relative to the stationary torque tube 22 by means of a plurality of multi-armed spiders 46, each spider having a central bearing 48 embracing the shaft and a roller 50 at the end of each arm engaged in circular channel cross-section track 52 fastened to the cylinder inside surface. The spiders thus locate the cylinder axially as well as radially.

In this particular embodiment, the drive between the turbine and the generator consists of an endless chain 54 fastened by radial pins 56 to the cylinder inner surface, the chain being engaged by sprockets 58 on the input shaft of a gear box 60 suspended from and stationary with the torque shaft 22. The output shaft of the gear box carries a helical gear 62 engaged with input gears of two electric generators 64 symetrically disposed on a platform 66 suspended from and stationary with the shaft. The outputs of the generators pass via cables 68 through the interior of the tube 22 to a vertical output tube 70 (FIG. 1) leading the wires upward so that they can pass to shore without the possibility of trailing in the water.

The chain 54 operates with its lower part submerged in a bath of oil and is totally enclosed, except for the portion engaged by the sprocket, by a central circular channel member 72 and two side rings 74. The member 72 is carried by a multi-armed spider 76 mounted on the shaft 22, while the rings 74 are fastened to the cylinder inner wall. The chain carries oil with it that is received by a tube 78 forming a vertically descending arm of the spider 76, the oil entering the tube thus being available for delivering to any part of the generator at which it may be required, e.g. by tubes such as 80.

The turbine may in some instances be covered by a light cylindrical casing 82 conforming to the outline and having its edges close to the adjacent water levels. For example, in Northern locations this will protect the turbine from snow, the heat which is retained beneath the casing also ensuring that ice and snow will not build up on the turbine, and that the stream or river adjacent the turbine will not become ice covered to stop operation of the turbine.

Although an electric generator is illustrated and described as the power output device for the turbine, it will be apparent to those skilled in the art that other types of generator can also be employed, such as one supplying liquid or air under pressure via hoses fed into and out of the turbine through the stationary hollow torque tube.

I claim:

1. A stream powered turbine, comprising restraining means for holding said turbine in the stream against a flow of water therein, said restraining means including a torque member;

an elongated body rotatably mounted on said torque member and having inner and outer cylindrical surfaces;

a plurality of vanes spaced circumferentially about said body outer surface and extending radially outwardly therefrom, each of said vanes having at least one opening therethrough;

a valve member mounted on each vane adjacent each opening and severally adapted to uncover the associated opening upon encountering a tail wave, to close such opening while such vane is in the stream, and to uncover such opening as such vane exits the stream;

a generator mounted on said torque member within said body;

drive means arranged within said body and operative to transmit rotational movement of said body to said generator, said drive means including an endless chain fastened to said body inner surface and a sprocket engaging said chain and arranged to drive said generator; and a casing mounted on said body inner surface and enclosing said chain except proximate said sprocket.

2. The turbine as set forth in claim 1 wherein a portion of said chain proximate the bottom of said body passes through a bath of oil, and further comprising delivering means for supplying oil entrained by said chain to other parts of said turbine.

3. The turbine as set forth in claim 1 wherein said delivering means includes a spider member having an upwardly-extending hollow arm communicating with said casing proximate the top of said body and arranged to receive oil carried by said chain.

4. The turbine as set forth in claim 1 wherein said casing includes an annular channel-shaped member arranged in spaced facing relation to said body inner surface, and an annular side ring member mounted on said body inner surface and extending radially inwardly therefrom and fastened to said channel-shaped member.

* * * * *